United States Patent
Oka (10) Patent No.: US 8,516,811 B2
(45) Date of Patent: Aug. 27, 2013

(54) OIL PRESSURE SYSTEM AND VALVE ASSEMBLY USED IN OIL PRESSURE SYSTEM

(75) Inventor: Shunji Oka, Komatsu (JP)

(73) Assignee: Komatsu Ltd., Tokyo (JP)

( * ) Notice: Subject to any disclaimer, the term of this patent is extended or adjusted under 35 U.S.C. 154(b) by 737 days.

(21) Appl. No.: 12/809,734

(22) PCT Filed: Nov. 12, 2008

(86) PCT No.: PCT/JP2008/070579
§ 371 (c)(1),
(2), (4) Date: Jun. 21, 2010

(87) PCT Pub. No.: WO2009/104313
PCT Pub. Date: Aug. 27, 2009

(65) Prior Publication Data
US 2010/0281859 A1    Nov. 11, 2010

(30) Foreign Application Priority Data
Feb. 20, 2008  (JP) ................................ 2007-038511

(51) Int. Cl.
*F16D 31/02* (2006.01)
(52) U.S. Cl.
USPC ............................................. 60/421; 60/429
(58) Field of Classification Search
USPC .............. 60/421, 422, 429, 484, 486; 91/516
See application file for complete search history.

(56) References Cited

U.S. PATENT DOCUMENTS

| 6,883,634 B2 * | 4/2005 | Toyokawa et al. | 180/374 |
| 7,412,827 B2 * | 8/2008 | Verkuilen | 60/486 |
| 7,441,407 B2 * | 10/2008 | Sawada | 60/431 |
| 2007/0074511 A1 | 4/2007 | Verkuilen | |

FOREIGN PATENT DOCUMENTS

| GB | 2 431 436 A | 4/2007 |
| JP | 3-74669 A | 3/1991 |
| JP | 5-27423 U | 4/1993 |
| JP | 2001-141045 A | 5/2001 |
| JP | 2003-143904 A | 5/2003 |
| JP | 2004-36681 A | 2/2004 |
| JP | 2006-38236 A | 2/2006 |
| JP | 2007-177868 A | 7/2007 |
| WO | WO-2007/074633 A1 | 7/2007 |

OTHER PUBLICATIONS

European Search Report of corresponding EP Application No. 08 87 2665.8 dated May 24, 2012.

* cited by examiner

*Primary Examiner* — Michael Leslie
(74) *Attorney, Agent, or Firm* — Global IP Counselors, LLP (57) ABSTRACT

In the oil pressure system, a control unit sets a flow passage changeover valve to be in a merging state, and sets a relief pressure to a low relief pressure via a relief pressure changeover unit in the case that the rotational speed of the engine is lower than a predetermined threshold level. Also, the control unit sets the flow passage changeover valve to be in a branching state, and sets the relief pressure to a high relief pressure via the relief pressure changeover unit in the case that the rotational speed of the engine is the predetermined threshold level or higher.

3 Claims, 10 Drawing Sheets

|  | Eng LOW ROTATION | Eng HIGH ROTATION |
|---|---|---|
| LESS THAN OIL TEMPERATURE T°C OR WHEN FLOW PASSAGE CHANGEOVER VALVE HAS FAILED | TWO-PUMP | TWO-PUMP |
| OIL TEMPERATURE T°C OR HIGHER | TWO-PUMP | SINGLE-PUMP |

(b)

|  | TWO-PUMP | SINGLE-PUMP |
|---|---|---|
| RELIEF PRESSURE | LOW | HIGH |

OIL PRESSURE SYSTEM AND VALVE ASSEMBLY USED IN OIL PRESSURE SYSTEM

CROSS-REFERENCE TO RELATED APPLICATIONS

This national phase application claims priority to Japanese Patent Application No. 2008-038511 filed on Feb. 20, 2008. The entire disclosures of Japanese Patent Application No. 2008-038511 are hereby incorporated herein by reference.

TECHNICAL FIELD

The present invention relates to an oil system, and specifically relates to an oil system provided with a relief valve for compensating the pressure of the high-pressure circuit, and to a valve assembly used in the oil system.

BACKGROUND ART

Conventionally, there is known a system that feeds pressure oil discharged from a fixed-capacity pump to a high-pressure circuit of a clutch or the like, depressurizes and feeds the pressure oil of the high-pressure circuit using a relief valve to a low-pressure circuit of a lubrication circuit or the like (e.g., see FIG. 2 of Japanese Laid-open Utility Model Application No. 5-2742 as an illustration of prior art).

Figure 7:
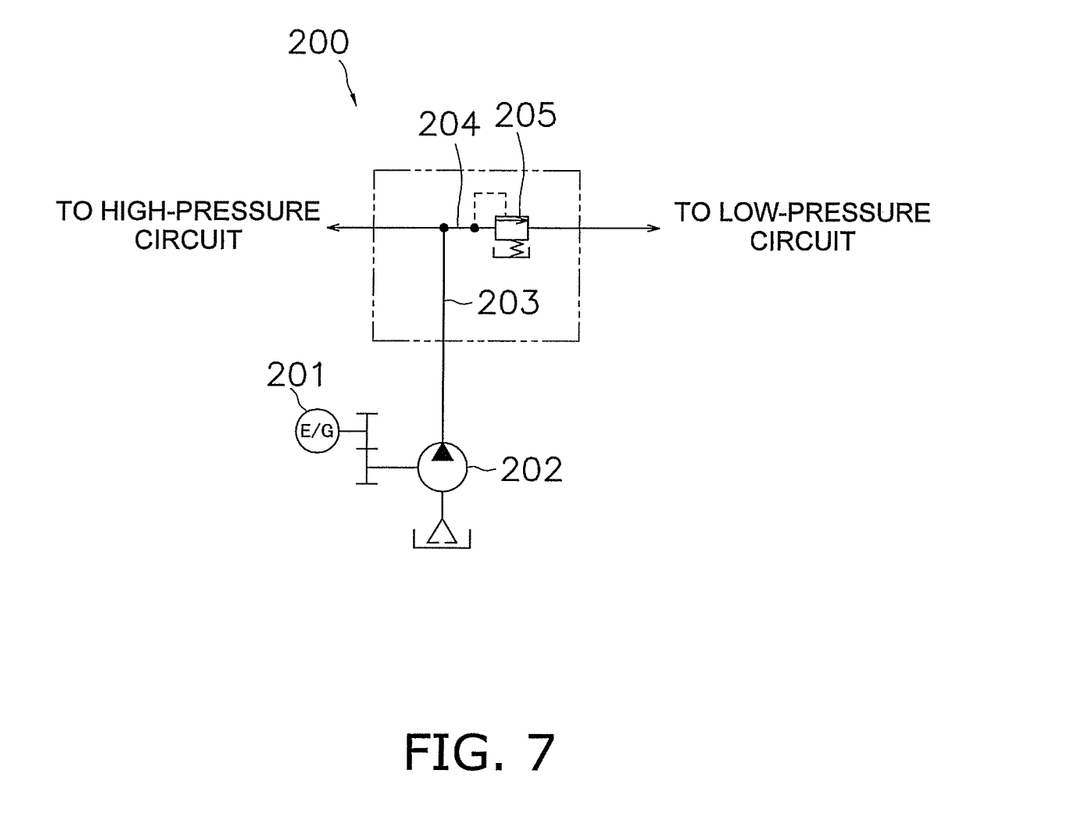
FIG. 7 is an oil pressure circuit diagram showing the configuration of a conventional oil pressure system.

Such a conventional system will be described with reference to FIG. 7. This conventional oil pressure system 200 is provided with an engine 201, an oil pressure pump 202, a first flow passage 203, a relief flow passage 204, and a relief valve 205. The oil pressure pump 202 is driven by the engine 201, and the discharge rate of the pressure oil is varied in accordance with the rotational speed of the engine 201. The first flow passage 203 is connected to a predetermined high-pressure circuit and is a flow passage for feeding pressure oil discharged from the oil pressure pump 202 to the high-pressure circuit. The relief flow passage 204 is a flow passage for connecting the first flow passage 203 and the low-pressure circuit. The relief valve 205 closes the relief flow passage 204 when the pressure of the pressure oil that flows through the first flow passage 203 is at a predetermined relief pressure or less, and opens the relief flow passage 204 when the pressure of the pressure oil that flows through the first flow passage 203 is greater than the relief pressure. In other words, the relief valve 205 has the role of feeding pressure oil to the low-pressure circuit while compensating the pressure of the high-pressure circuit.

Figure 8:
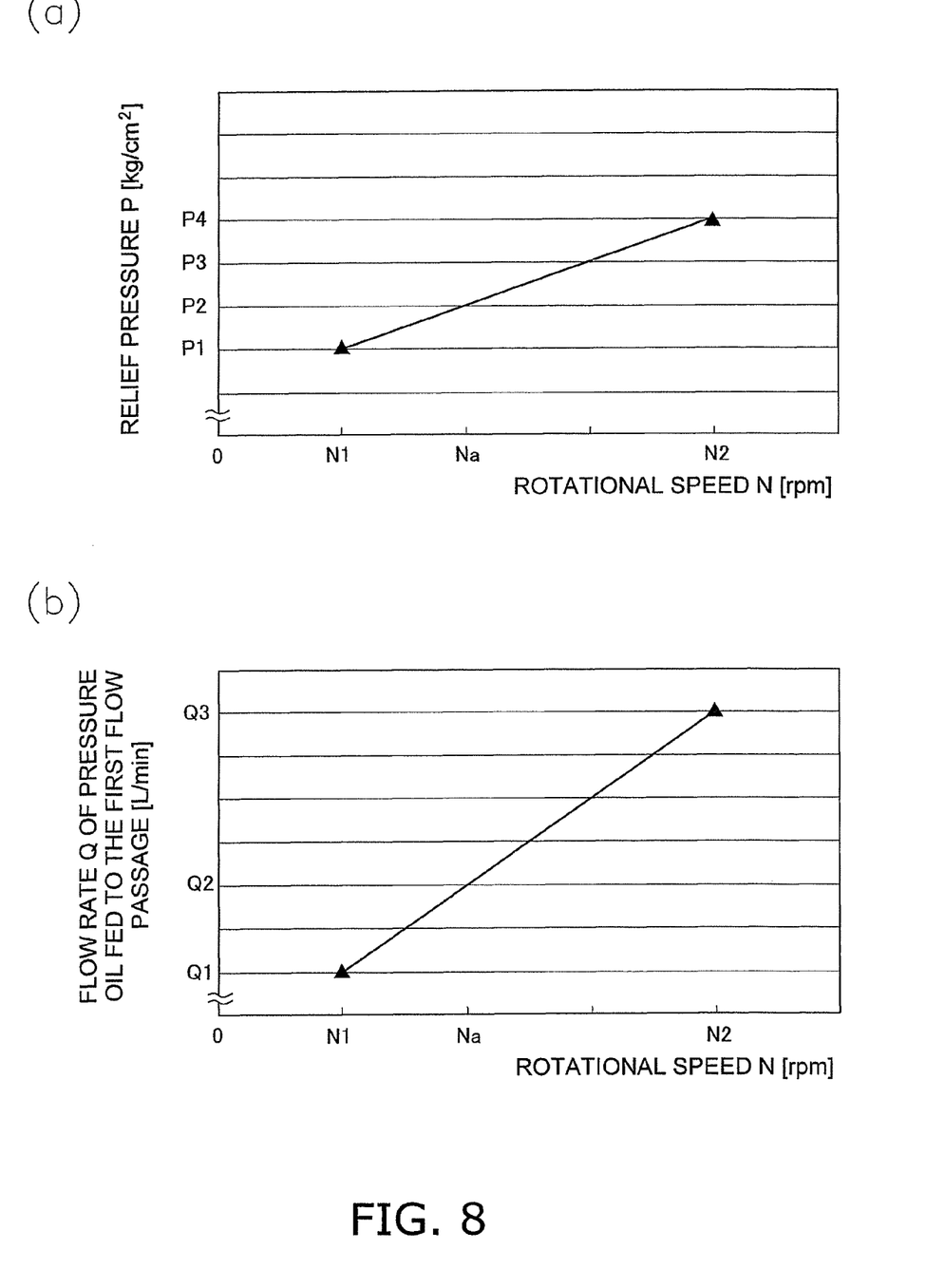
FIG. 8 is a graph showing the variation between the relief pressure and the flow rate of pressure oil fed to the first flow passage in a conventional oil pressure system.

In this configuration, the oil pressure pump 202 is a fixed-capacity pump, and the flow rate of the pressure oil fed to the first flow passage 203 is therefore increased in accompaniment with the increased rotational speed of the engine 201, as shown in FIG. 8(b). The oil pressure pump 202 is selected in accordance with a specification that allows a required oil quantity Q1 to be supplied when the engine 201 is rotating at a low-idle rotational speed N1. FIG. 8(b) shows the relationship between the engine rotational speed and the flow rate of the pressure oil fed to the high-pressure circuit via the first flow passage 203.

Generally, there are many cases in which the low-pressure circuit requires a greater quantity of oil than does the high-pressure circuit. In the conventional system described above, the loss of power is considerable because the pressure oil is fed to the low-pressure circuit via the relief valve 205, which is constantly set to a high relief pressure.

In order to solve this problem, oil pressure systems such as that shown in Japanese Laid-open Utility Model Application No. 5-2742 have been proposed in which there are used a low-capacity high-pressure pump for a high-pressure circuit and a high-capacity low-pressure pump for a low-pressure circuit. In the art of Japanese Laid-open Utility Model Application No. 5-2742, a technique is disclosed in which a priority valve is provided between the low-pressure circuit and the clutch circuit, which is a high-pressure circuit, and the priority valve is operated during clutch operation to feed the discharge oil of the high-capacity low-pressure pump to the high-pressure circuit side.

SUMMARY

In order to solve the problems described above, an oil pressure system 300 (hereinafter referred to as "oil pressure system related to the reference example") such as that shown in FIG. 9 has been proposed. The oil pressure system 300 related to the reference example is provided with an engine 301, a first oil pressure pump 302, a second oil pressure pump 303, a first flow passage 304, a second flow passage 305, a relief flow passage 306, a relief valve 307, and a flow passage changeover valve 308.

The first oil pressure pump 302 and the second oil pressure pump 303 are driven by the engine 301 and vary the discharge amount of the pressure oil in accordance with the rotational speed of the engine 301.

The first flow passage 304 is connected to the high-pressure circuit and is a flow passage for feeding pressure oil discharged from the first oil pressure pump 302 to the high-pressure circuit. The second flow passage 305 is connected to the low-pressure circuit and is a flow passage for feeding pressure oil discharged from the second oil pressure pump 303 to the low-pressure circuit. The relief flow passage 306 is a flow passage for connecting the first flow passage 304 and the second flow passage 305.

The relief valve 307 closes the relief flow passage 306 when the pressure of the pressure oil that flows through the first flow passage 304 is at a predetermined relief pressure or less, and opens the relief flow passage 306 when the pressure of the pressure oil that flows through the first flow passage 304 is greater than the relief pressure.

The flow passage changeover valve 308 can be changed over between a merging state and a branching state by a command from a control unit (not shown). When the flow passage changeover valve 308 is in a merging state, the pressure oil discharged from the first oil pressure pump 302 and the pressure oil discharged from the second oil pressure pump 303 are merged and fed to the first flow passage 304. In other words, the pressure oil discharged from the two pumps; i.e., the first oil pressure pump 302 and the second oil pressure pump 303 is fed to the high-pressure circuit via the first flow passage 304 (hereinbelow, this state is referred to as "two-pump state"). When the flow passage changeover valve 308 is a branching state, the pressure oil discharged from the first oil pressure pump 302 is fed to the first flow passage 304 and the pressure oil discharged from the second oil pressure pump 303 is fed to the second flow passage 305. In other words, only the pressure oil discharged from the first oil pressure pump 302 is fed to the high-pressure circuit via the first flow passage 304 (hereinbelow, this state is referred to as "single-pump state").

In this oil pressure system 300, the flow passage changeover valve 308 is set in the merging state when the rotational speed of the engine is less than a predetermined threshold level, and the flow passage changeover valve 308 is set in a branching state when the rotational speed of the engine is at the predetermined threshold level or higher.

Figure 9:
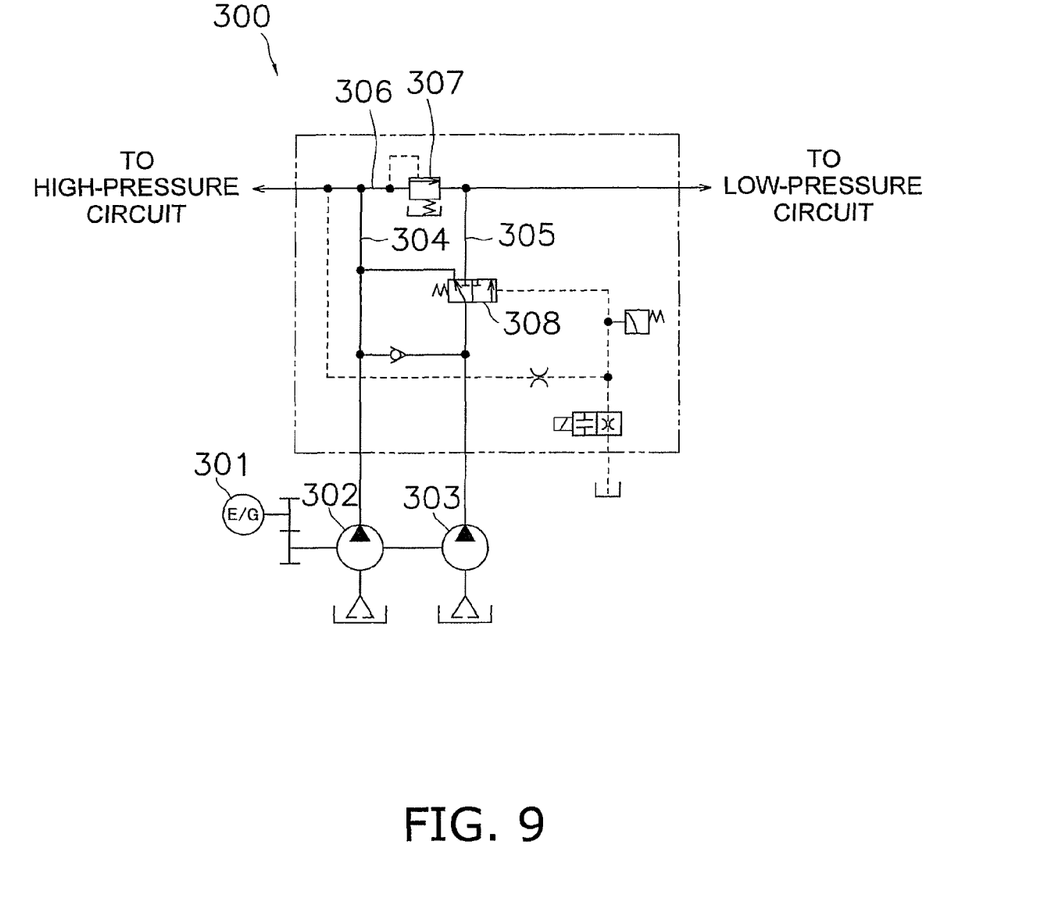
FIG. 9 is an oil pressure circuit diagram showing the configuration of the oil pressure system according to the reference example.
Figure 10:
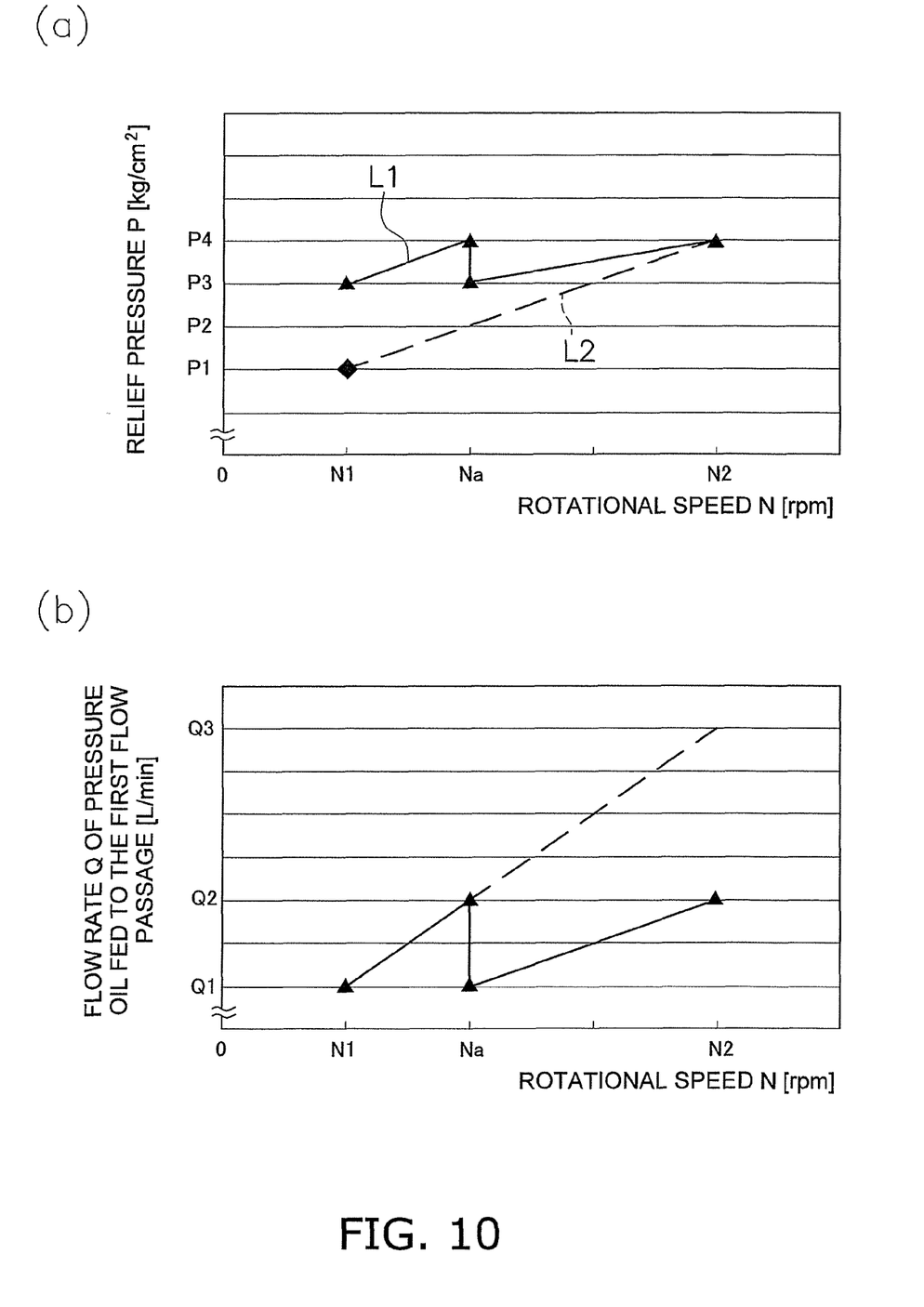
FIG. 10 is a graph showing the variation between the relief pressure and the flow rate of pressure oil fed to the first flow passage in the oil pressure system according to the reference example.

FIG. 10(a) shows the relationship between the relief valve and the rotational speed of the engine, and FIG. 10(b) shows the relationship between the flow rate of the pressure oil fed to the first flow passage 304 and the rotational speed of the engine, in the oil pressure system according to the reference example shown in FIG. 9. The first oil pressure pump 302 and the second oil pressure pump 303 are selected so as to satisfy the required oil quantity Q1 when the rotational speed of the engine is N1, which is a low-idle rotational speed, and to satisfy the required oil quantity Q2 when the rotational speed of the engine is N2, which is a high-idle rotational speed, as shown in FIG. 10(b). Therefore, the flow rate of the pressure oil fed to the high-pressure circuit is reduced when the rotational speed of the engine is greater than the threshold level Na, in comparison with the conventional system shown by the broken line in FIG. 10(b). A loss of engine horsepower can thereby be reduced in the oil pressure system 300 according to the reference example in comparison with the conventional oil pressure system 200.

The relief pressure of the relief valve is not always constant and has a characteristic (override characteristic) in which the relief pressure also increases as the flow rate of the pressure oil that passes through the relief valve increases.

Variation of the relief pressure due to the override characteristic in the conventional system 200 shown in FIG. 7 will be described with reference to FIG. 8. As described above, the oil pressure pump 202 is a fixed-capacity pump, and the discharge amount therefore increases as the rotational speed of the engine 201 increases, as shown in FIG. 8(b). A predetermined amount of the pressure oil discharged from the oil pressure pump 202 is fed to the high-pressure circuit, and the remainder is fed to the low-pressure circuit by way of the relief valve 205. The amount of oil that passes through the relief valve 205 increases as the rotational speed of the engine 201 increases. Therefore, the relief pressure of the relief valve 205 also increases the rotational speed of the engine 201 due to the override characteristic, as shown in FIG. 8(a). FIG. 8(a) shows the relationship between the relief pressure and the rotational speed of the engine.

As described above, in the oil pressure system 300 according to the reference example, switching between a single-pump state and a two-pump state in accordance with the rotational speed of the engine makes it possible to reduce the loss of engine horsepower, particularly in the case of the single-pump state in which the rotational speed of the engine is high. However, in the case of the oil pressure system 300 according to the reference example, the relief pressure in the two-pump state in which the rotational speed of the engine is low is greater than the relief pressure in the conventional oil pressure system 200 due to the override characteristic described above, and the loss of engine horsepower is likely to increase. For example, when the oil pressure system is designed so that the relief pressure is P4 in the case that the rotational speed of the engine is N2, which is a relatively high rotation, as indicated by the solid line L1 in the FIG. 10(a), the relief pressure in the two-pump state in which the rotational speed of the engine is relatively low (N<Na) becomes greater than the relief pressure in the conventional oil pressure system 200 indicated by the broken line L2 and engine horsepower is lost.

An object of the present invention is to provide an oil pressure system that can reduce the loss of engine horsepower.

The oil pressure system according to the first aspect of the present invention includes an engine, a first oil pressure pump, a second oil pressure pump, a first flow passage, a second flow passage, a third flow passage, a relief flow passage, a relief valve, a flow passage changeover valve, a relief pressure changeover unit, and a control unit. The first oil pressure pump and the second oil pressure pump are driven by the engine and configured to vary the discharge quantity of the pressure oil in accordance with the rotational speed of the engine. The first flow passage is a flow passage for feeding pressure oil discharged from the first oil pressure pump to a predetermined high-pressure circuit. The second flow passage is a flow passage that is connected to a predetermined low-pressure circuit. The third flow passage is a flow passage connected to the second oil pressure pump. The relief flow passage is a flow passage connecting the first flow passage and the second flow passage via the relief valve. The relief valve is configured and arranged to close the relief flow passage when the pressure of the pressure oil that flows through the first flow passage is at a predetermined relief pressure or less. The relief valve is configured and arranged to open the relief flow passage and relieves the pressure oil of the first flow passage into the second flow passage when the pressure of the pressure oil that flows through the first flow passage is greater than the relief pressure. The flow passage changeover valve can switch between a merging state and a branching state. In the merging state, the third flow passage is connected to the first flow passage, and the pressure oil discharged from the first oil pressure pump and the pressure oil discharged from the second oil pressure pump merge and flow to the first flow passage. In the branching state, the third flow passage is connected to the second flow passage, and pressure oil discharged from the first oil pump flows to the first flow passage, and pressure oil discharged from the second oil pump flows to the second flow passage. The relief pressure changeover unit can switch the relief pressure of the relief valve between a predetermined high relief pressure, and a predetermined low relief pressure that is lower than the high relief pressure. The control unit is configured and arranged to set the flow passage changeover valve to be in the merging state and to use the relief pressure changeover unit to set the relief pressure to the low relief pressure in the case that the rotational speed of the engine is lower than a predetermined threshold level. Also, the control unit is configured and arranged to set the flow passage changeover valve to be in the branching state, and, to use the relief pressure changeover unit to set the relief pressure to the high relief pressure in the case that the rotational speed of the engine is equal to or higher than the predetermined threshold level.

In this oil pressure system, the flow passage changeover valve is set in a merging state when the rotational speed of the engine is less than the predetermined threshold valve. The pressure oil discharged from the first oil pressure pump and the pressure oil discharged from the second oil pressure pump are thereby merged and fed to the high-pressure circuit via the first flow passage. In the case that the rotational speed of the engine is equal to or greater than the threshold level, the flow passage changeover valve is set in a branching state. The pressure oil discharged from the first oil pressure pump is therefore fed to the high-pressure circuit via the first flow passage. The pressure oil discharged from the second oil pressure pump is fed to the low-pressure circuit via the second flow passage. It is therefore possible to suppress excessive amounts of pressure oil being fed to the high-pressure circuit, and the loss of horsepower can be reduced. In the case that the flow passage changeover valve is in the merging state, the relief pressure is set to be the low relief pressure by the relief pressure changeover unit. It is therefore possible to suppress an increase in the relief pressure in the merging state, and the loss of horsepower can be reduced.

The oil pressure system according to the second aspect of the present invention is the oil pressure system of the first aspect, wherein the relief valve includes a valve body configured and arranged to open and close the relief flow passage, and an urging member configured and arranged to urge the valve body in the direction of closing the relief flow passage. The relief pressure changeover unit includes a pressing member. A pilot pressure receiver is formed in the pressing member on the side opposite of the urging member, and the pressing member presses the urging member in the direction of closing the relief flow passage by the pilot pressure acting on the pilot pressure receiver. The control unit includes a pilot flow passage and a pilot pressure control unit. The pilot flow passage is a flow passage for feeding pressure oil for causing the pilot pressure to operate on the flow passage changeover valve and causing the flow passage changeover valve to switch from the merging state to the branching state, and for feeding pressure oil for causing the pilot pressure to operate on the pilot pressure receiver of the pressing member. The pilot pressure control unit is configured to control the supplying and discharging of pressure oil to and from the pilot flow passage.

In this oil pressure system, when pressure oil is fed by the pilot pressure control unit to the pilot flow passage, the pilot pressure acts on the flow passage changeover valve and the flow passage changeover valve switches from a merging state to a branching state. When the pressure oil is fed to the pilot flow passage, the pilot pressure acts on the pilot pressure receiver of the pressing member and the pressing member presses the urging member of the relief valve in the direction of closing the relief flow passage. The relief pressure of the relief valve is thereby changed from low relief pressure to high relief pressure. Conversely, when the pressure oil is released from the pilot flow passage, the flow passage changeover valve is changed over from a branching state to a merging state. Also, the pressing of pressing member on the urging member is terminated. The relief pressure is thereby changed over from high relief pressure to low relief pressure. Thus, in this oil pressure system, the relief pressure can be changed over in coordination with the switching of the flow passage changeover valve using a simple configuration.

The valve assembly according to the third aspect of the present invention includes a casing, a flow passage changeover valve, a relief valve, a relief pressure changeover unit, and a pilot flow passage. The casing includes a first flow passage, a second flow passage, a third flow passage, and a relief flow passage. The first flow passage is a flow passage arranged to connect a first oil pressure pump to a predetermined high-pressure circuit. The second flow passage is a flow passage arranged to be connected to a low-pressure circuit. The third flow passage is a flow passage arranged to be connected to the second oil pressure pump. The relief flow passage is a flow passage connecting the first flow passage and the second flow passage. The flow passage changeover valve is disposed in the casing and can switch between a merging state and a branching state. The flow passage changeover valve connects the third flow passage to the first flow passage in the merging state. The flow passage changeover valve connects the third flow passage to the second flow passage in the branching state. The relief valve is disposed inside the relief flow passage, and includes a valve body configured and arranged to open and close the relief flow passage and an urging member configured and arranged to urge the valve body in the direction of closing the relief flow passage. The relief pressure changeover unit is disposed in the casing and includes a pressing member that is moved by operation of the pilot pressure in the direction of pressing the urging member. The pilot flow passage is disposed in the casing, directs to the flow passage changeover valve a pilot pressure for switching the flow passage changeover valve to the branching state, and directs to the relief pressure changeover unit a pilot pressure for moving the pressing member in the direction in which the urging member is pressed.

In the valve assembly, when pressure oil is fed to the pilot flow passage, the pilot pressure acts on the flow passage changeover valve and the flow passage changeover valve is changed over from a merging state to a branching state. Also, when the pressure oil is fed to the pilot flow passage, the pilot pressure acts on the relief pressure changeover unit and the pressing member presses the urging member of the relief valve in the direction of closing the relieve flow passage. The relief pressure of the relief valve is thereby changed from low relief pressure to high relief pressure. Conversely, when the pressure oil is released from the pilot flow passage, the flow passage changeover valve is changed over from a branching state to a merging state. Also, the pressing of pressing member on the urging member is terminated. The relief pressure is thereby changed over from high relief pressure to low relief pressure. Thus, in this valve assembly, the relief pressure can be changed over in coordination with the switching of the flow passage changeover valve using a simple configuration.

DETAILED DESCRIPTION OF EMBODIMENT(S)

Configuration of Oil Pressure System

Figure 1:
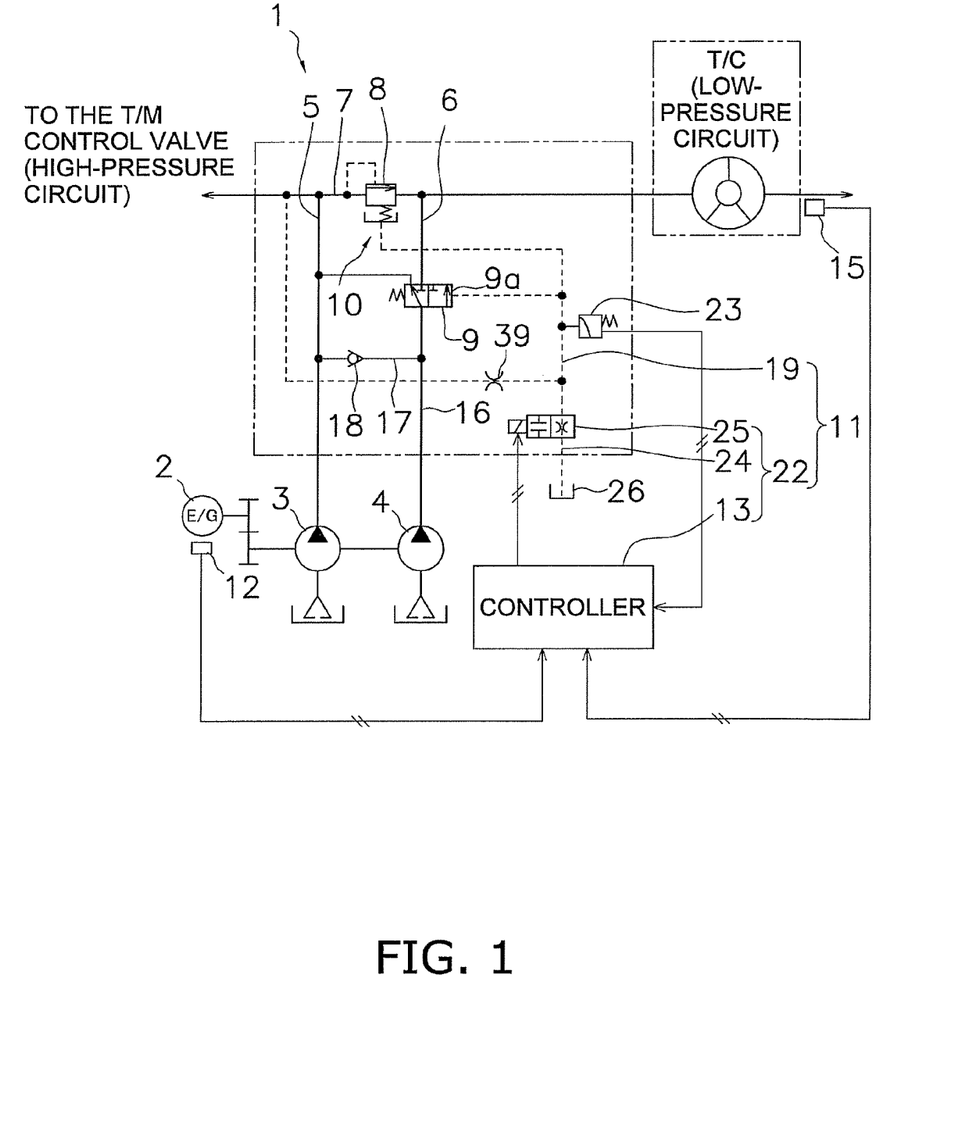
FIG. 1 is an oil pressure circuit diagram showing the configuration of an oil pressure system.

FIG. 1 shows the oil pressure system 1 according to an embodiment of the present invention. The oil pressure system 1 is mounted in, e.g., a bulldozer or another work vehicle, and has an engine 2, a first oil pressure pump 3, a second oil pressure pump 4, a first flow passage 5, a second flow passage 6, a third flow passage 16, a relief flow passage 7, a relief valve 8, a flow passage changeover valve 9, a relief pressure changeover unit 10, and a control unit 11.

The engine 2 is, e.g., a diesel engine, and the output torque and rotational speed are controlled by controlling the amount of fuel injected from a fuel injection device (not shown). The rotational speed of the engine 2 is detected by an engine rotational speed sensor 12 and sent as a detection signal to a later-described controller 13.

The first oil pressure pump 3 and the second oil pressure pump 4 are driven by the engine 2 and are fixed-capacity oil pressure pumps for varying the discharge amount of pressure oil in accordance with the rotational speed of the engine 2.

The first flow passage 5 is connected to the first oil pressure pump 3 and is a flow passage for feeding pressure oil discharged from the first oil pressure pump 3 to a predetermined high-pressure circuit. The high-pressure circuit is an oil pressure circuit through which pressure oil flows under higher pressure than the later-described low-pressure circuit, and includes a T/M control valve for driving, e.g., a gearshift clutch of a transmission (T/M). The temperature of the pressure oil fed to the high-pressure circuit is detected by an oil-temperature sensor 15 and is fed as the detection signal to a later-described controller 13. In this configuration, the oil-temperature sensor 15 detects the oil temperature at the outlet of the torque converter (T/C) and the oil temperature at the outlet of the torque converter (T/C) is used as the oil temperature of the pressure oil fed to the high-pressure circuit. However, the oil temperature sensor may be disposed in the high-pressure circuit to directly detect the temperature of the pressure oil in the high-pressure circuit.

The second flow passage 6 is a flow passage connected to a predetermined low-pressure circuit. The low-pressure circuit is an oil pressure circuit through which pressure oil flows at a lower pressure than the high-pressure circuit, and includes, e.g., torque converter (T/C).

The third flow passage 16 is connected to the second oil pressure pump 4. Also, the third flow passage 16 is connected by a fourth flow passage 17 to the first flow passage 5 via the relief valve 8. A non-return valve 18 is configured so as to allow pressure oil to flow from the third flow passage 16 toward the first flow passage 5, and to prevent pressure oil from flowing from the first flow passage 5 toward the third flow passage 16.

A relief flow passage 7 provided with a relief valve 8 is disposed between the first flow passage 5 and the second flow passage 6. The relief flow passage 7 is a flow passage for connecting the first flow passage 5 and the second flow passage 6.

The relief valve 8 closes the relief flow passage 7 when the pressure oil that flows through the first flow passage 5 is at a predetermined relief pressure or less. The relief valve 8 opens the relief flow passage 7 and relieves the pressure oil of the first flow passage 5 to the second flow passage 2 when the pressure of the pressure oil that flows through the first flow passage 5 is higher than the relief pressure. The relief valve 8 thereby plays the role of feeding pressure oil to the second flow passage as well, while compensating the pressure of the pressure oil that flows through the first flow passage 5. The specific configuration of the relief valve 8 is later described in detail.

The flow passage changeover valve 9 is a valve that can switch between a merging state and a branching state. In the merging state, the flow passage changeover valve 9 connects the third flow passage 16 to the first flow passage 5. The pressure oil discharged from the first oil pressure pump 3 and the pressure oil discharged from the second oil pressure pump 4 thereby merge and flow to the first flow passage 5. In the branching state, the flow passage changeover valve 9 connects the third flow passage 16 to the second flow passage 6. The pressure oil discharged from the first oil pressure pump 3 thereby flows to the first flow passage 5, and the pressure oil discharged from the second oil pressure pump 4 flows to the second flow passage 6. The flow passage changeover valve 9 is changed over from the merging state to the branching state when pressure oil is fed via the later-described pilot flow passage 19 and pilot pressure is applied. Also, the flow passage changeover valve 9 is kept in the merging state by the urging force of a spring in a state in which the pilot pressure is not applied.

The relief pressure changeover unit 10 is capable of switching the relief pressure of the relief valve 8 between a predetermined high relief pressure and a low relief pressure that is lower than the high relief pressure. The relief pressure changeover unit 10 varies the urging force of a first urging member 35 of the relief valve 8 by using the pressure of the pressure oil fed via the pilot flow passage 19 and thereby switches the relief pressure. The specific configuration of the relief pressure changeover unit 10 is later described in detail.

The control unit 11 is a mechanism for coordinating and controlling the switching of the flow passage changeover valve 9 and the switching the relief pressure of the relief valve 8. The control unit 11 has a pilot flow passage 19 and a pilot pressure control unit 22.

The pilot flow passage 19 is a flow passage for causing the pilot pressure to act on the flow passage changeover valve 9 and feeding pressure oil for switching from the merging state to the branching state. The pilot flow passage 19 is connected to the first flow passage 5 via a restrictor 39. The pilot flow passage 19 depressurizes a portion of the pressure oil that flows through the first flow passage 5, via the restrictor 39, and directs the depressurized oil to a pilot pressure receiver 9a of the flow passage changeover valve 9. A pressure switch 23 is provided to the pilot flow passage 19. The pressure switch 23 detects whether the pressure of the pressure oil that flows through the pilot flow passage 19 is at a predetermined value or higher. The pressure switch 23 sends a detection signal to a later-described controller 13 to thereby detect the switching state of the flow passage changeover valve 9 and the switching state of the relief pressure of the relief valve 8.

The pilot flow passage 19 is also connected to a pilot pressure receiver 41 (see FIGS. 3 and 4) of the relief pressure changeover unit 10. The relief pressure of the relief valve 8 can be changed over by the relief pressure changeover unit 10 from a low relief pressure to a high relief pressure in a state in which a predetermined oil pressure is being generated in the pilot flow passage 19 due to the operation of the later-described pilot pressure control unit 22. When the pressure oil is discharged from the relief pressure changeover unit 10 via the pilot flow passage 19, the relief pressure of the relief valve 8 is changed over from high relief pressure to low relief pressure.

The pilot pressure control unit 22 is a mechanism for controlling the supply and release of pressure oil to and from the pilot flow passage 19. The pilot pressure control unit 22 has a release flow passage 24, an electromagnetic switching valve 25, and a controller 13.

The release flow passage 24 is a flow passage for connecting the electromagnetic switching valve 25 and a tank 26.

The electromagnetic switching valve 25 is disposed between the release flow passage 24 and the pilot flow passage 19. The pilot flow passage 19 is placed in communication with the tank 26 via the release flow passage 24 when the electromagnetic switching valve 25 is in an open state. The pilot flow passage 19 is blocked from communication with the tank 26 when the electromagnetic switching valve 25 is in a closed state, and a predetermined pilot pressure is generated in the pilot flow passage 19.

The controller 13 is composed of a CPU, memory, and the like, and is capable of electrically controlling the electromagnetic switching valve 25. The controller 13 controls the electromagnetic switching valve 25 on the basis of the rotational speed of the engine and the oil temperature of the pressure oil fed to the high-pressure circuit.

Figure 2:
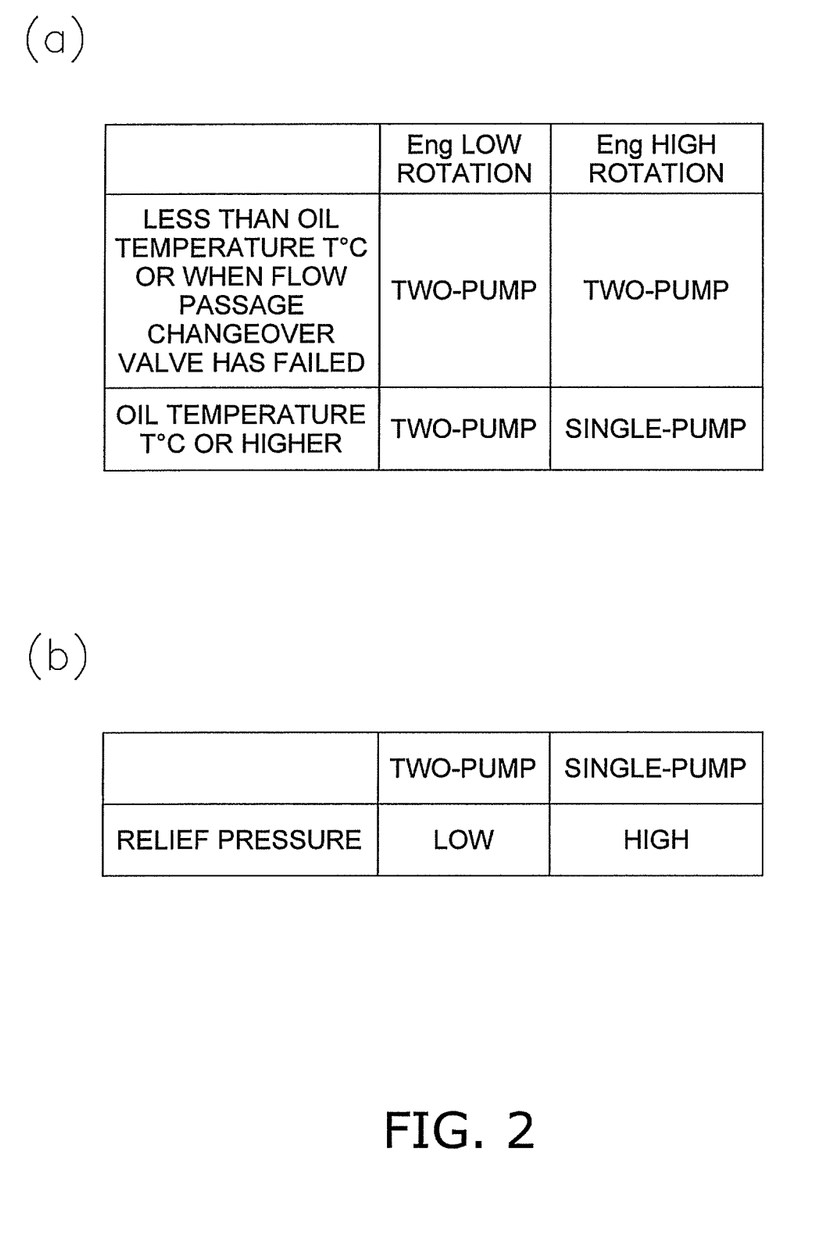
FIG. 2 is a diagram showing the control details in an oil pressure system.

The controller 13 sets the electromagnetic switching valve 25 in an open state regardless of the rotational speed of the engine in the case that the oil temperature is less than a predetermined temperature T, as shown in FIG. 2(a). The pilot flow passage 19 is thereby placed in communication with the tank 26 and oil pressure is not generated in the pilot flow passage 19. As a result, the flow passage changeover valve 9 is set in a merging state and pressure oil is fed to the high-pressure circuit in a two-pump state. The relief pressure of the relief valve 8 is a low relief pressure established only by spring force (see FIG. 2(b)). Thus, the flow passage changeover valve 9 is set in a merging state when the oil temperature is low, whereby pressure oil can be fed to the high-pressure circuit at a sufficient flow rate even when the viscosity of the pressure oil is high. Pressure oil can be fed to the high-pressure circuit in a two-pump state even when the flow passage changeover valve 9 has failed.

The controller 13 switches the electromagnetic switching valve 25 in accordance with the rotational speed of the engine in the case that the oil temperature is at a temperature T or higher. Specifically, the electromagnetic switching valve 25 is set in an open state when the rotational speed of the engine is lower than a predetermined threshold level Na (see FIG. 5). The pilot flow passage 19 is thereby placed in communication with the tank 26 and oil pressure is not generated in the pilot flow passage 19. As a result, the flow passage changeover valve 9 is set in a merging state and pressure oil is fed to the high-pressure circuit in a two-pump state. The relief pressure of the relief valve 8 is a low relief pressure established only by spring force (see FIG. 2(b)). The controller 13 sets the electromagnetic switching valve 25 in a closed state when the rotational speed of the engine is at a threshold level Na or higher. A predetermined pilot pressure is thereby generated in the pilot flow passage 19, the flow passage changeover valve 9 is set in the branching state, and pressure oil is fed to the high-pressure circuit in a single-pump state. The relief pressure of the relief valve 8 is established by the sum of the spring force and the force produced by the pilot pressure that acts on the relief pressure changeover unit 10, and the relief pressure is set to a high relief pressure.

Configuration of Relief Valve

Figure 3:
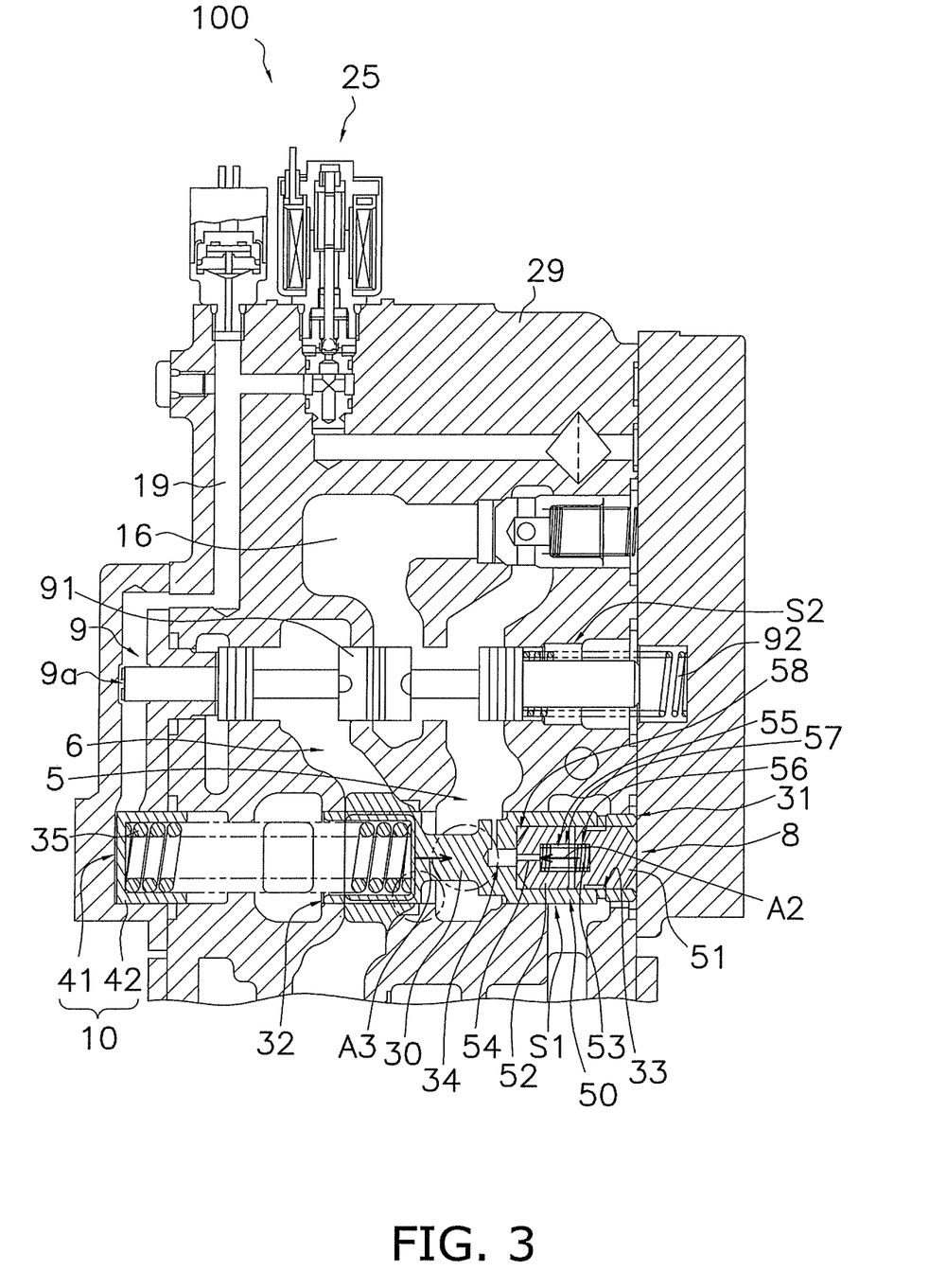
FIG. 3 is a cross-sectional view of the valve assembly.

The relief valve 8 is provided with a spool 30 (valve body), a first urging member 35, and an internal piston 50, as shown in FIG. 3. The relief valve 8 constitutes a portion of the valve assembly 100 shown in FIG. 3. The valve assembly 100 has a casing 29, and included in the casing 29 in addition to the relief valve 8 are the flow passage changeover valve 9, the relief pressure changeover unit 10, the electromagnetic switching valve 25, and the like described above.

A first accommodation space S1 for storing the spool 30 of the relief valve 8, and a second accommodation space S2 for accommodating the flow passage changeover valve 9 are formed in the casing 29. The various flow passages described above are formed in the casing 29, but for the sake of convenience of description among these flow passages in FIG. 3, reference numerals are used for only the first flow passage 5, the second flow passage 6, the third flow passage 16, and the pilot flow passage 19.

The spool 30 is disposed in the first accommodation space S1 and can move in the axial direction (left/right direction in FIG. 3) in the first accommodation space S1. The spool 30 opens and closes the relief flow passage 7 (see FIG. 1). Specifically, the spool 30 moves in the leftward direction in the drawing to a predetermined relief position to thereby open the relief flow passage 7 and form a relief state. Also, the spool 30 moves from the relief position to the rightward direction in the drawing to thereby close the relief flow passage 7 and form a closed state. A first internal space 33 and a first communication passage 34 are formed in the spool 30. The first internal space 33 is provided in a recessed fashion from a first end portion 31 toward a second end portion 32 which is on the opposite side of the first end portion 31, and has a cylindrical shape that corresponds to the shape of the internal piston 50. The first end portion 31 is one end of the spool 30 in the axial direction, and the second end portion 32 is the other end of the spool 30 in the axial direction. The first communication passage 34 is formed from the side surface of the spool 30 across to the bottom surface of the concavity that constitutes the first internal space 33, and is in communication with the first flow passage 5.

The first urging member 35 is a spring for urging the spool 30 in the direction of closing the relief flow passage 7. The first urging member 35 is provided together with the spool 30 in the first accommodation space S1, one end is secured to a later-described pressing member 42, and the other end is secured to the second end portion 32 of the spool 30. The first urging member 35 thereby presses the second end portion 32 side of the spool 30 and urges in the direction (rightward direction in FIG. 3) for closing the relief flow passage 7.

The internal piston 50 is accommodated in the first internal space 33 of the spool 30 and is capable of moving in the axial direction. The internal piston 50 has a first piston section 51, a second piston section 52, and a second urging member 53.

The first piston section 51 is arranged further to the first end portion 31 side than the second piston section 52 in the first internal space 33. A concavity 56 recessed in the axial direction is provided to one end of the first piston section 51.

The second piston section 52 is arranged in alignment with the first piston section 51 in the axial direction on the second end portion 32 side from the first piston section 51. A concavity 57 recessed in the axial direction is formed on one end of the second piston section 52 facing the first piston section 51. The other end of the second piston section 52 faces the first communication passage 34. The concavity 57 of the second piston section 52 and the concavity 56 of the first piston section 51 constitute a second internal space 55. The second internal space 55 is formed between the first piston section 51 and the second piston section 52. A second communication passage 54 is formed in the second piston section 52 along the axial direction. The second communication passage 54 is in communication with the second internal space 55 and a space 58 positioned on the first communication passage 34 side from the internal piston 50 of the first internal space 33.

The second urging member 53 is disposed between the first piston section 51 and the second piston section 52, and generates a reaction force between the first piston section 51 and the second piston section 52. The second urging member 53 is accommodated in the second internal space 55.

In the relief valve 8, the pressure oil of the first flow passage 5 passes through the first communication passage 34 and the second communication passage 54 and is filled into the second internal space 55. The force (see arrow A2 of FIG. 3) by which the pressure oil filled into the second internal space 55 presses on the spool 30 via the second piston section 52 and the urging force (see arrow A3 of FIG. 3) applied to the spool 30 from the first urging member 35 are balanced. When the pressure of the pressure oil of the first flow passage 5 increases, the spool 30 moves in the leftward direction of the drawing against the urging force A3 of the first urging member 35. In the case that the pressure of the pressure oil of the first flow passage 5 has reached a predetermined relief pressure, the spool 30 is in a relief state in which the relief flow passage 7 is open and relieving of the pressure oil is performed.

Configuration of Relief Pressure Changeover Unit 10

Figure 4:
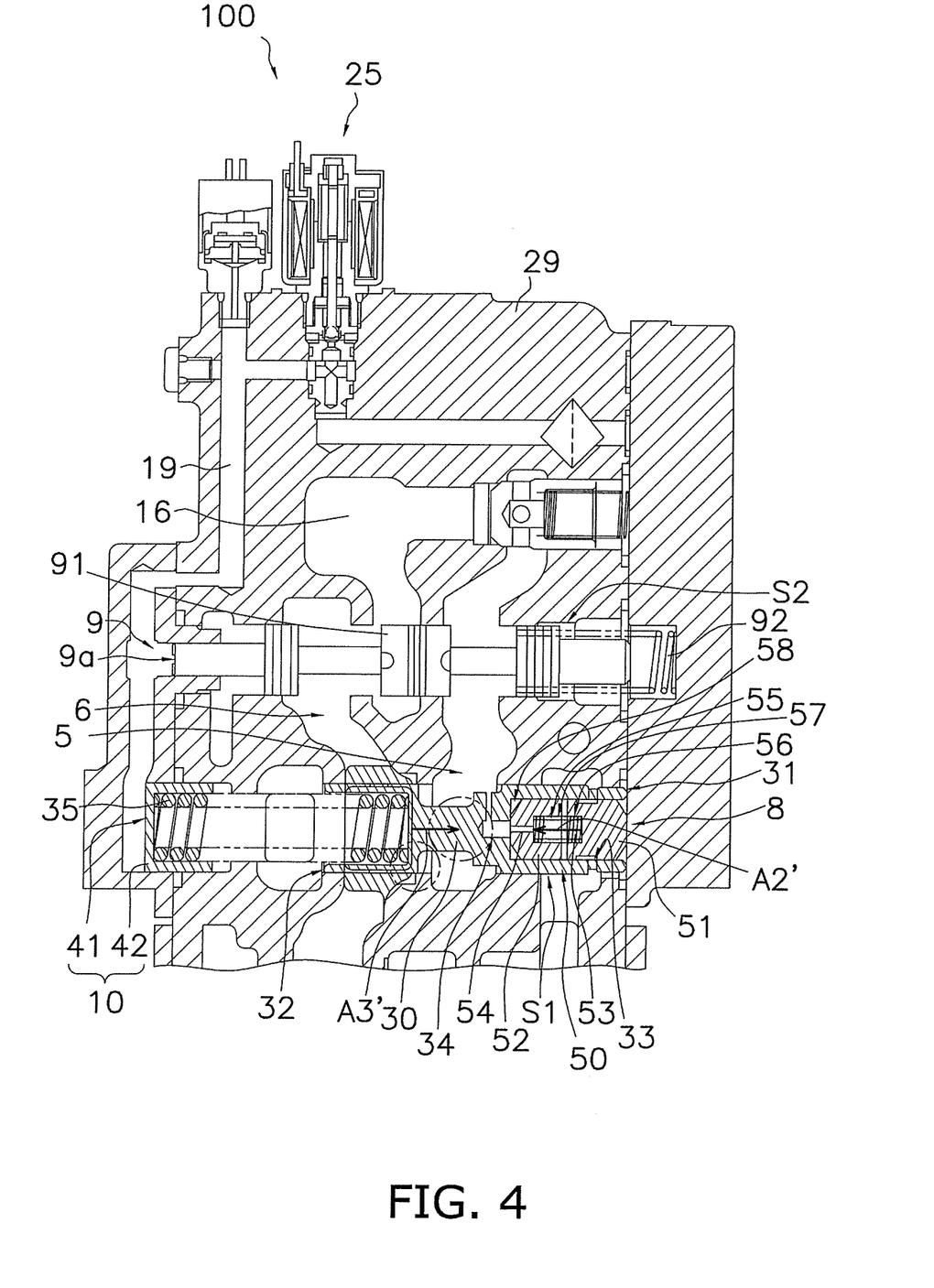
FIG. 4 is a cross-sectional view of the valve assembly.

The relief pressure changeover unit 10 has includes the pressing member 42. The pressing member 42 is coaxially arranged with the spool 30 via the first urging member 35, and can be moved in the axial direction of the first urging member 35 and the spool 30. The pilot pressure receiver 41 is formed on the side opposite from the first urging member 35 in the pressing member 42. The pilot pressure receiver 41 is configured so that the pilot pressure in the pilot flow passage 19 has effect.

In the relief pressure changeover unit 10, the pressing member 42 presses the first urging member 35 when a predetermined pilot pressure is produced in the pilot flow passage 19. The first urging member 35 is thereby compressed, as shown in FIG. 4. At this point, the urging force (see arrow A3' of FIG. 4) applied from the first urging member 35 to the spool 30 increases. Accordingly, the force (see arrow A2' of FIG. 4) required for moving the spool 30 against this urging force also increases. The relief pressure of the relief valve 8 is thereby set to be a high relief pressure.

In FIGS. 3 and 4, the appearance of the specific operation of the electromagnetic switching valve 25 is omitted, and the state of communication and blocking of the pilot flow passage 19 with tank 26 is schematically shown, in accompaniment with the depiction of the operation of the electromagnetic switching valve 25.

When the pilot flow passage 19 is in communication with the tank 26 and the pilot pressure is substantially 0, the first urging member 35 extends and returns to its original state. At this point, the urging force (see arrow A3 of FIG. 3) applied from the first urging member 35 to the spool 30 is reduced. Accordingly, the force (see arrow A2 of FIG. 3) required for moving the spool 30 against this urging force is also reduced. The relief pressure of the relief valve 8 is thereby set to be a low relief pressure.

Configuration of Flow Passage Changeover Valve

A spool 91 of the flow passage changeover valve 9 is arranged in the second accommodation space S2 of the casing 29 and can move in the axial direction (left/right direction in FIG. 3) in the second accommodation space S2. A third urging member 92 is provided to one end side of the spool 91 and urges the spool 91 toward the other side (left side in FIG. 3). The pilot pressure receiver 9a on which the oil pressure of the pilot flow passage 19 acts is formed on the other end side of the spool 91.

When a predetermined pilot pressure is generated in the pilot flow passage 19, the spool 91 moves against the urging force of the third urging member 92, and the third flow passage 16 and the second flow passage 6 are placed in communication (see FIG. 4). When the pilot pressure of the pilot flow passage 19 is substantially 0, the spool 91 is pressed back by the urging force of the third urging member 92 and the third flow passage 16 is placed in communication with the first flow passage 5 (see FIG. 3).

Thus, in the oil pressure system 1, the flow passage changeover valve 9 can be changed over to switch between the merging state and the branching state and the relief pressure can be changed over using a simple configuration.

Figure 5:
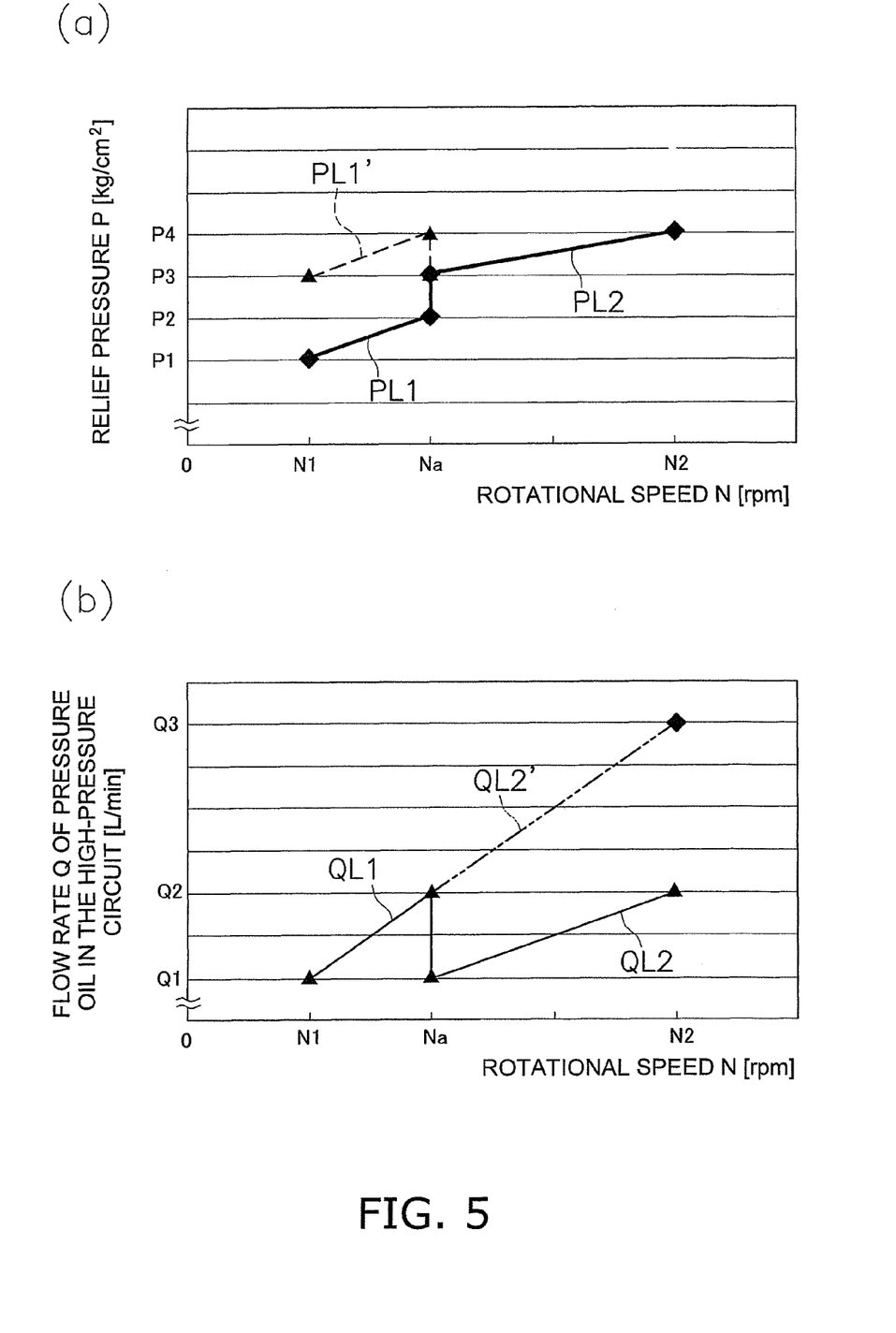
FIG. 5 is a graph showing the variation between the relief pressure and the oil pressure of the high-pressure circuit when the oil temperature is high.

(1) In the oil pressure system 1, the relief pressure and the flow rate of the pressure oil in the high-pressure circuit varies, as shown in FIG. 5, in the case that the oil temperature is at a temperature T or higher.

In other words, the flow passage changeover valve 9 is set to be in a merging state and the relief pressure is set to a low relief pressure when the rotational speed of the engine 2 is lower than a predetermined threshold level Na (N1≦N≦Na). In this case, pressure oil is fed to the high-pressure circuit from both the first oil pressure pump 3 and the second oil pressure pump 4, and the total flow rate thereof varies between Q1 and Q2 in accordance with the rotational speed of the engine, as shown by the solid line QL1 in FIG. 5(b). The relief pressure varies between P1 and P2 in accordance with the flow rate of the pressure oil, as shown by the solid line PL1 in FIG. 5(a). In contrast, the relief pressure varies between P3 and P4 in accordance with the flow rate of the pressure oil, as shown by the broken line PL1', when the relief pressure is not be changed over. Thus, in the oil pressure system 1, the relief pressure is suppressed, whereby the loss of engine horsepower can be reduced. Also, the durability of the high-pressure circuit can be improved when the relief pressure is suppressed.

The flow passage changeover valve 9 is set to be in a branching state and the relief pressure is set to a high relief pressure when the rotational speed of the engine is at a predetermined threshold level Na or higher (Na≦N≦N2). In this case, pressure oil is not fed from the second oil pressure pump 4, pressure oil is fed to the high-pressure circuit from the first oil pressure pump 3, and the flow rate of the pressure oil varies between Q1 and Q2 as shown by the solid line QL2 in FIG. 5(b). In contrast, the flow rate further increases from Q2 and varies between Q2 and Q3, as shown by the alternating long- and two short-dashes line, in the case that the two-pump state is maintained. Thus, in the oil pressure system 1, an increase in the flow rate of the pressure oil fed to the high-pressure circuit is suppressed, whereby the loss of engine horsepower can be reduced.

Figure 6:
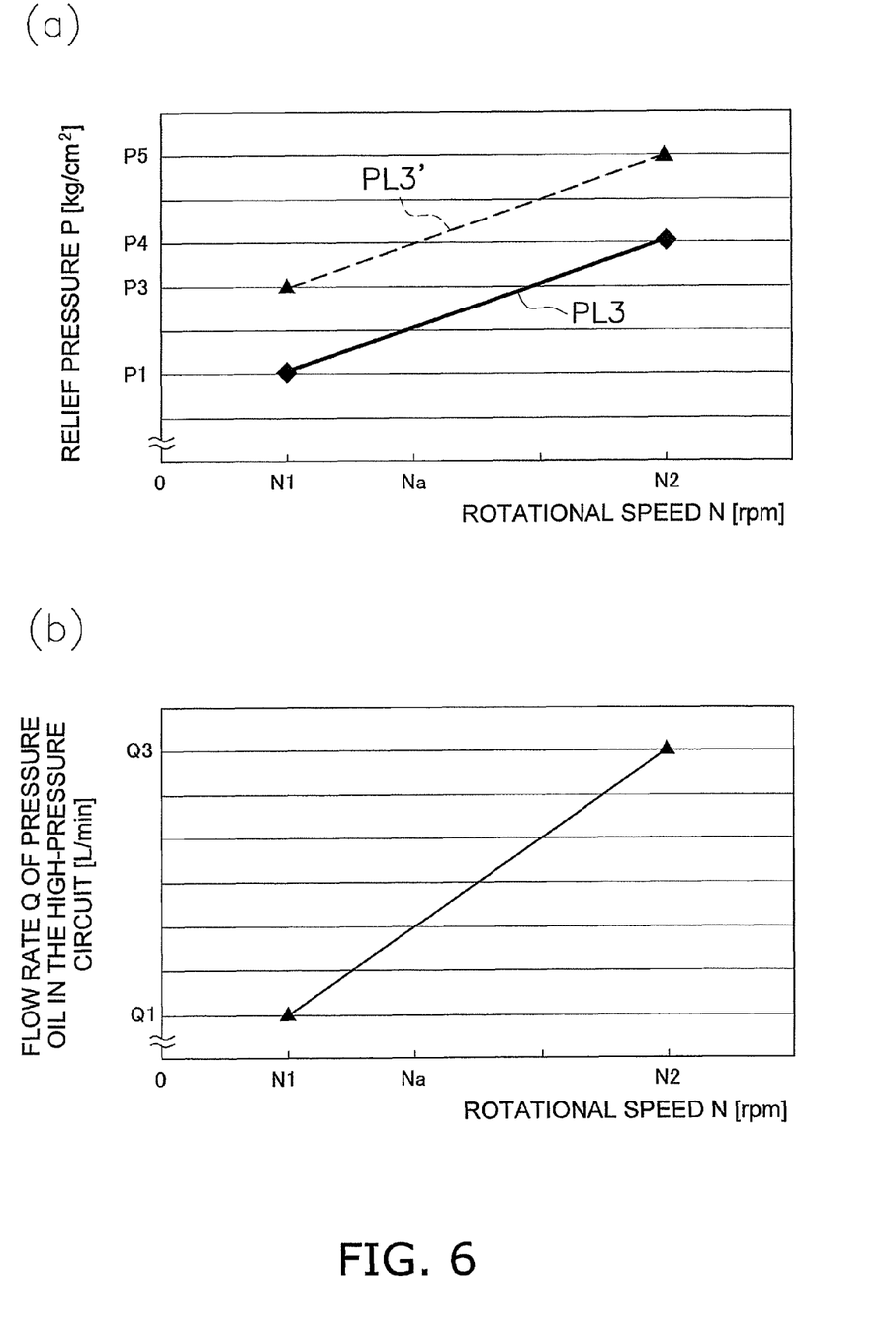
FIG. 6 is a graph showing the variation between the relief pressure and the oil pressure of the high-pressure circuit when the oil temperature is low.

(2) In the oil pressure system 1, the relief pressure and the flow rate of the pressure oil in the high-pressure circuit are varied, as shown in FIG. 6, when the oil temperature is less than the temperature T or when the flow passage switching valve 9 has failed.

In other words, the flow passage changeover valve 9 is kept in a merging state and the relief pressure is kept low regardless of the rotational speed of the engine. The relief pressure varies between P1 and P4 in accordance with the variation in the rotational speed of the engine, as shown by the solid line P3 in FIG. 6(a). In contrast, the relief pressure varies between P3 and P5, as shown by the broken line PL3', when the relief pressure cannot be changed over and high relief pressure is maintained. Thus, in the oil pressure system 1, the loss of engine horsepower can be reduced by suppressing the relief pressure. In this case, the flow rate of the pressure oil in the high-pressure circuit varies between Q1 to Q3, as shown in FIG. 6(b).

OTHER EMBODIMENTS (a) In the embodiment described above, an example of an oil pressure system mounted in a work vehicle was described, but application of the present invention is not limited thereto, and the oil pressure system may be provide with a relief valve for compensating the oil pressure of the high-pressure circuit.

(b) In the embodiment described above, the configuration of the control unit 11 is implemented by a mechanical configuration that coordinates the changeover between a single-pump state and a two-pump state, and the changeover of the relief pressure, but the changeovers may be carried out using electrical control. However, in the oil pressure system 1 according to the embodiment described above, the changeovers can be coordinated in a simple configuration. Therefore, the configuration according to the embodiment described above is preferred from the viewpoint of reducing costs.

In the oil pressure system according to the above illustrated embodiments, the relief pressure is set to a low relief pressure in the two-pump state and to a high relief pressure in the single-pump state. The increase in relief pressure in the two-pump state can be suppressed thereby, and the loss of engine horsepower can be reduced.

The invention claimed is:

1. An oil pressure system comprising:
an engine;
a first oil pressure pump and a second oil pressure pump driven by the engine and configured to vary discharge quantity of pressure oil in accordance with rotational speed of the engine;
a first flow passage arranged to feed the pressure oil discharged from the first oil pressure pump to a predetermined high-pressure circuit;
a second flow passage connected to a low-pressure circuit;
a third flow passage connected to the second oil pressure pump;
a relief flow passage connecting the first flow passage and the second flow passage;
a relief valve configured to close the relief flow passage when the pressure of the pressure oil that flows through the first flow passage is at a relief pressure or less, the relief valve being configured to open the relief flow passage and relieve the pressure oil of the first flow passage into the second flow passage when the pressure of the pressure oil that flows through the first flow passage is greater than the relief pressure;
a flow passage changeover valve configured to switch between
a merging state wherein the third flow passage is connected to the first flow passage, and the pressure oil discharged from the first oil pressure pump and the pressure oil discharged from the second oil pressure pump are merged and fed to the first flow passage, and
a branching state wherein the third flow passage is connected to the second flow passage, the pressure oil discharged from the first oil pump is fed to the first flow passage, and the pressure oil discharged from the second oil pump is fed to the second flow passage;
a relief pressure changeover unit configured to switch the relief pressure of the relief valve between a predetermined high relief pressure, and a predetermined low relief pressure that is lower than the high relief pressure; and
a control unit configured and arranged to set the flow passage changeover valve to be in the merging state and to use the relief pressure changeover unit to set the relief pressure to the low relief pressure in the case that the rotational speed of the engine is lower than a predetermined threshold level, and to set the flow passage changeover valve to be in the branching state and to use the relief pressure changeover unit to set the relief pressure to the high relief pressure in the case that the rotational speed of the engine is equal to or higher than the predetermined threshold level.

2. The oil pressure system according to claim 1, wherein the relief valve includes a valve body configured and arranged to open and close the relief flow passage, and an urging member configured and arranged to urge the valve body in a direction of closing the relief flow passage,
the relief pressure changeover unit includes a pressing member including a pilot pressure receiver formed on a side opposite of the urging member, and configured to press the urging member in the direction of closing the relief flow passage by a pilot pressure acting on the pilot pressure receiver, and
the control unit includes a pilot flow passage and a pilot pressure control unit, the pilot flow passage being configured and arranged to feed pressure oil to operate on the flow passage changeover valve so that the flow passage changeover valve switches from the merging state to the branching state, and to feed pressure oil to operate on the pilot pressure receiver of the pressing member, and the pilot pressure control unit being configured to control supplying and discharging of pressure oil to and from the pilot flow passage.

3. A valve assembly comprising:
a casing including a first flow passage arranged to connect a first oil pressure pump to a predetermined high-pressure circuit, a second flow passage arranged to be connected to a low-pressure circuit, a third flow passage arranged to be connected to a second oil pressure pump, and a relief flow passage connecting the first flow passage and the second flow passage;
a flow passage changeover valve configured to switch between a merging state wherein the third flow passage is connected to the first flow passage, and a branching state wherein the third flow passage is connected to the second flow passage, the flow passage changeover valve being disposed inside the casing;
a relief valve including a valve body configured and arranged to open and close the relief flow passage, and an urging member configured and arranged to urge the valve body in the direction of closing the relief flow passage, the relief valve being disposed inside the relief flow passage;
a relief pressure changeover unit including a pressing member configured to be moved by operation of the pilot pressure in a direction of pressing the urging member, the relief pressure changeover unit being disposed inside the casing; and
a pilot flow passage arranged to direct a pilot pressure to the flow passage changeover valve to switch the flow passage changeover valve to the branching state, and to direct the pilot pressure to the relief pressure changeover unit to move the pressing member in the direction in which the urging member is pressed, the pilot flow passage being disposed inside the casing.

* * * * *